ary source of compressor driving power to

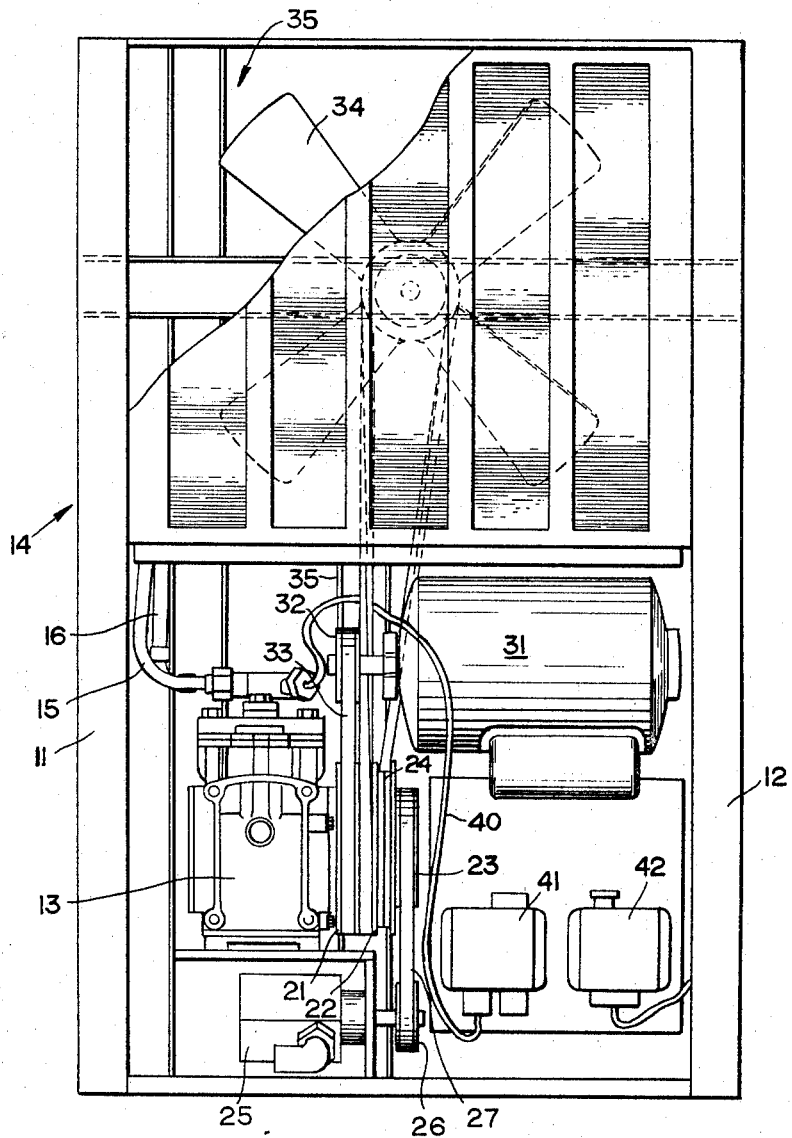

United States Patent Office 3,477,637
Patented Nov. 11, 1969

3,477,637
MOBILE REFRIGERATION UNIT HAVING SHAFT IN COMMON WITH COMPRESSOR, FAN DRIVE MEANS AND SELECTABLE HYDRAULIC OR ELECTRIC MOTOR
Randall W. Johnson, Lexington, Mass., assignor to Automatic Radio Mfg. Co., Inc., Melrose, Mass., a corporation of Massachusetts
Filed May 2, 1968, Ser. No. 726,126
Int. Cl. F04b *49/02, 27/00;* F04d *15/02*
U.S. Cl. 230—214                         6 Claims

ABSTRACT OF THE DISCLOSURE

A mobile refrigeration unit has a compressor with a crankshaft carrying three adjacent pulleys. The two closest pulleys are continually maintained in fixed relationship to the compressor crankshaft. One of these pulleys is for receiving rotative power from an electric motor. The other is for delivering power to the condensor and evaporator fans. A clutch selectively connects the third pulley in fixed relationship to the crankshaft for then receiving rotative power from a hydraulic motor. When the compressor is driven hydraulically, the clutch is engaged and the electric motor idles. When the compressor is driven electrically, the clutch is disengaged so that the hydraulic motor does not load the system.

BACKGROUND OF THE INVENTION

The present invention relates in general to mobile refrigeration units and more particularly concerns a novel thru-the-panel refrigeration unit especially suitable for use with an automobile or truck having a hydraulic power source that may be used to drive the refrigeration unit when the engine is running. It is often necessary to provide an auxiliary source of compressor driving power to maintain refrigeration when the truck is stationary with the engine off. While such units are available, the relative orientation of the different system elements makes assembly in a compact easily installable thru-the-wall unit difficult.

Accordingly, it is an object of this invention to provide a compact thru-the-wall vehicle refrigeration unit capable of being driven by hydraulic or electrical power.

It is another object of the invention to achieve the preceding object with a compact physical arrangement that facilitates manufacture and assembly relatively easily and at relatively low cost while insuring reliable operation over long periods of time.

SUMMARY OF THE INVENTION

According to the invention, there is a compressor having a crankshaft that carries first and second relatively fixed driving elements and a third driving element rotatable about the compressor crankshaft axis. Clutch means selectively connects the third driving element to the first two. Means are provided for coupling a hydraulic motor to the third driving element and an electric motor to one of the first two driving elements. Means are also provided for coupling a fan to the other of the first and second driving elements. The hydraulic motor normally receives hydraulic power from a source that is operative when the vehicle engine is running. Actuation of the clutch means then transmits driving power from the hydraulic motor to the compressor crankshaft to drive the compressor, the fan and the electric motor. When the vehicle engine is not running, electrical energy may be applied to the electric motor with the clutch disengaged so that the electric motor supplies power only to the compressor and the fans.

BRIEF DESCRIPTION OF THE DRAWING

Numerous other features, objects and advantages of the invention will become apparent from the following specification when read in connection with the accompanying drawing, the single figure of which shows a view from the outside of a thru-the-wall vehicle refrigeration unit according to the invention.

DETAILED DESCRIPTION OF PREFERRED EMBODIMENTS

With reference now to the drawing, there is shown a view of a refrigeration unit according to the invention that may fit through an accommodating opening an a truck panel. The flanges 11 and 12 bolt to the vehicle panel. The compressor 13 receives gas from the evaporator coil 14 through inlet tube 15 for compression and releases to the condensor refrigerant under pressure through outlet tube 16.

An electric motor drive pulley 21 and fan drive pulley are permanently mounted on the shaft of compressor 13 for rotation therewith. A hydraulic motor drive pulley 23 is rotatable about the axis of the crankshaft of compressor 13 and engageable therewith through clutch 24. Clutch 24 is typically a one-way clutch that transmits power to the compressor crankshaft as long as hydraulic drive pulley 23 is being driven with power supplied from hydraulic motor 25 through means including hydraulic motor pulley 26 and belt 27, while disengaging when hydraulic motor 25 is not supplying power, the power then being supplied by electric motor 31 through means including electric pulley 32 and electric drive belt 33.

Driving the compressor shaft by the activated one of hydraulic motor 25 and electric motor 31 also drives evaporator fan 34 through means including fan pulley 22 and fan belt 35 having a 90° twist as indicated. Evaporator fan 34 is situated behind the evaporator coils 14. The refrigeration coils are located behind the evaporator fan 34, a portion 35 being visible. The cooling coils are arranged to be inside the compartment to be cooled.

A pressure cutout 41 is also shown coupled to compressor 13 by a line 40 and functions to cut off the operative one of hydraulic motor 25 or electric motor 31 when the pressure sensed is outside predetermined safe limits. Such pressure cutouts are will known in the art and further description is unnecessary here. A temperature control 42 functions to turn on and off the selected one of hydraulic motors 25 and electric motor 31 in accordance with the temperature sensed by a thermostat (not shown) in the compartment being cooled.

There has been described a refrigeration unit featuring an especially compact arrangement of driving and driven elements facilitating the relatively economical and rapid assembly and installation of a vehicle refrigeration unit. The specific example described herein is by way of example only for illustrating the best mode now contemplated for practicing the invention. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:
1. A mobile refrigeration unit comprising,
  compressor means having a crankshaft carrying first and second relatively fixed driving elements,
  a third driving element, means for supporting said third driving element rotatably about the axis of said crankshaft, clutch means for selectively coupling rotation of said third driving element to said first and second driving elements, means for coupling a hydraulic motor to said third driving element, means for coupling an electric motor to one of said first and second driving elements, fan means, means for coupling said fan means to the other of said first and second driving elements, and means for effecting engagement of said clutch means when said hydraulic motor is energized to transmit rotation of said third driving element to said first and second driving elements and drive said compressor means and said fan means.

2. A mobile refrigeration unit in accordance with claim 1 and further comprising, said hydraulic motor, said electric motor, said electric motor being driven when said compressor means and said fan means are driven with said clutch means engaged, and means for effecting disengagement of said clutch means when said hydraulic motor is deenergized whereby energization of said electric motor causes rotation of said crankshaft through means including said one driving element to drive said compressor and said fan means while said third driving element is then stationary.

3. A mobile refrigeration unit in accordance with claim 2 wherein said driving elements each comprise a pulley rotatable about said crankshaft axis, said means for coupling said hydraulic motor to said third driving element comprising a pulley rotatable about the axis of rotation of said hydraulic motor and belt means interconnecting the latter pulley and the third driving element pulley.

4. A mobile refrigeration unit in accordance with claim 3 wherein said means for coupling said electric motor to said one driving element comprises a pulley rotatable about the axis of rotation of said electric motor and belt means interconnecting the latter pulley and the one driving element pulley.

5. A mobile refrigeration unit in accordance with claim 4 wherein the crankshaft axis, the axis of rotation of said hydraulic motor and the axis of rotation of said electric motor are essentially parallel.

6. A mobile refrigeration unit in accordance with claim 5 wherein said means for coupling said fan means to said other driving element comprises a pulley rotatable about the axis of rotation of said fan means and belt means interconnecting the latter pulley and the other driving element pulley.

References Cited
UNITED STATES PATENTS 2,059,830  11/1936  Warner _____ 103—207 XR
2,104,387  1/1938  Hull et al. _____ 103—207 XR ROBERT M. WALKER, Primary Examiner U.S. Cl. X.R.
62—236; 103—207